United States Patent Office 3,461,288
Patented Aug. 12, 1969

3,461,288
CHEMICAL DOSIMETER
Gerald Oster, New York, N.Y., assignor to the United States of America as represented by the United States Atomic Energy Commission
No Drawing. Filed Mar. 22, 1966, Ser. No. 538,158
Int. Cl. G01f 1/06; H01j 39/00
U.S. Cl. 250—83
2 Claims The invention described herein was made in the course of, or under a contract with the U.S. Atomic Energy Commission.

This invention is related to a radiation dosimeter and method of manufacturing same.

With the advent of the use of radiation in the chemical and food processing fields the art has sought dosimeters which have structural stability to resist degradation from both chemical and radiation attacks inherent in such systems. Due to the strength of such attacks and the operating conditions present in such systems conventional dosimeters have proved unsatisfactory.

It is an object of this invention to provide those skilled in the art with an economical, accurate dosimeter in the form of a transparent plastic film, said dosimeters being capable of detecting and quantitatively measuring ionizing radiations such as gamma rays and X-rays.

It is a further object of this invention to provide those skilled in the art with an efficient economical method of producing radiation dosimeters usable in the radiological food and chemical processing industries.

These and other objects of this invention will in part be obvious and will in part appear hereinafter.

I have unexpectedly discovered a radiation dosimeter film for use in detecting and quantitatively measuring ionizing radiations such as gamma rays and X-rays comprising a plastic film of polyvinyl chloride having dispersed throughout said film from about 0.001 to about 1.0 weight percent 1,2,7,8-dibenzanthracene based on the total weight of said film, said film having a thickness of more than 1 micron.

I have further discovered that my novel dosimeter can be readily produced by a process comprising intimately blending mixture composed of from about 99.0 to about 99.999 weight percent polyvinyl chloride in powder form based on the total weight of the mixture and from about 0.001 to about 1.0 weight percent 1,2,7,8-dibenzanthracene in a powdered form based on the total weight of the mixture, moulding said polyvinyl chloride in said mixture into a shaped body such as a film of said polymerized mixture having said 1,2,7,8-dibenzanthracene mixture dispersed throughout said film, said film having a thickness of more than one micron.

Any conventional method of moulding the polyvinyl chloride object may be employed such as subjecting the mixture to a temperature ranging from about 120° C. to about 150° C. while subjecting the mixture to a pressure ranging from about 10,000 to about 20,000 pounds per square inch. It is to be understood that my invention is not limited to any specific method or conditions for moulding the polyvinyl chloride resin contained in the mixture and conventional means for effectuating such polymerization are well known to those skilled in the art.

The shape of my novel dosimeter will of course be dependent on the conditions prevalent in the systems in which my novel dosimeters are to be employed, e.g., film, bars, ball shaped, tubular etc. Suffice it to say that the molecular weight of the polyvinylchloride be above about 18,000 so that the dosimeter will have sufficient rigidity and should be adequate to prevent the 1,2,7,8-dibenzanthracene from leaching out of the film during its use.

The films of my invention can readily be formed during the polymerization step of my invention by carrying out the polymerization of the mixture heated to the desired temperature in a hydraulic press adjusted to the desired thickness and pressure. Further, the mixture can be polymerized in the form of relatively thick films from which films having the required thickness can be sliced.

The following example is given solely to illustrate the practice of this invention and is not to be considered as a limitation of my invention.

EXAMPLE

A mixture of the aromatic hydrocarbon 1,2,7,8-dibenzanthracene to the extent of 0.01% (by weight) was combined with powdered polyvinyl chloride. The mixture was placed in a heated hydraulic press and subjected to a pressure of 18,000 p.s.i. while being heated at 150° centigrade.

The resultant film shows an orange luminescence (when observed by a GE 4-watt Blak lamp) which increases with increasing dosage of ionizing radiation. Thus if the film is subjected to X-rays from a tungsten target source (Matchlett tube operated at 50 kv. and 10 milliamperes) the luminescence intensity increases linearly with increasing dosage of X-rays. The effect is linear with dosage and by this means a dosage of 600 roentgens is easily detectable.

Any source of light in the near ultraviolet range can be used to obtain a read off of the degree of radiation to which my novel dosimeters have been exposed.

Commercially available polyvinyl chloride resins having the desired molecular weight can be employed in the preparation of the dosimeters of my novel invention.

It will be obvious to those skilled in the art that my novel dosimeters are capable of being employed in the chemonuclear field. For example, since polyvinylchloride tubing is currently being employed in the chemical processing field, such tubing if prepared in accordance with the concept disclosed in this invention could be directly employed as a dosimeter as well as process tubing. This would allow for direct checking of radioactive contaminants in process lines simply by exposing such lines to near ultraviolet light.

I claim:
1. A radiation dosimeter film comprising a plastic body composed of polyvinyl chloride having dispersed throughout said body from about 0.001 to about 1.0 weight percent 1,2,7,8-dibenzanthracene based on the total weight of said film, said film having a thickness of more than 1 micron.

2. A process for producing a radiation dosimeter comprising:
    (a) intimately blending a mixture composed of from about 99.0 to about 99.999 weight percent polyvinyl chloride in powdered form based upon the total weight of the mixture and from about 0.001 to about 1.0 weight percent 1,2,7,8-dibenzanthracene in powdered form based upon the total weight of the mixture.

(b) heating said blended mixture to a temperature ranging from about 120° C. to about 150° C. while subjecting said mixture to a pressure ranging from about 10,000 to about 20,000 pounds per square inch.

References Cited

UNITED STATES PATENTS 3,214,383  10/1965  Moore et al. _____ 252—301.2

ROBERT F. BURNETT, Primary Examiner

WILLIAM J. VAN BALEN, Assistant Examiner

U.S. Cl. X.R.

161—165; 252—301; 264—331